US012770272B2

(12) United States Patent
Saha et al.

(10) Patent No.: US 12,770,272 B2
(45) Date of Patent: Oct. 20, 2026

(54) METHOD AND SYSTEM FOR PERFORMING CONTENT AWARE MULTI-OBJECT TRACKING

(71) Applicant: Tata Consultancy Services Limited, Mumbai (IN)

(72) Inventors: Ratul Kishore Saha, Thane (IN); Rekha Singhal, Thane (IN); Manoj Karunakaran Nambiar, Mumbai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 220 days.

(21) Appl. No.: 18/828,016

(22) Filed: Sep. 9, 2024

(65) Prior Publication Data

US 2025/0139790 A1 May 1, 2025

(30) Foreign Application Priority Data

Oct. 25, 2023 (IN) ............................. 202321072613

(51) Int. Cl.
*G06T 5/20* (2006.01)
*G06T 7/20* (2017.01)
(Continued)

(52) U.S. Cl.
CPC .................. *G06T 7/20* (2013.01); *G06T 5/20* (2013.01); *G06V 10/25* (2022.01); *G06V 10/764* (2022.01); *G06V 2201/07* (2022.01)

(58) Field of Classification Search
None
See application file for complete search history.

(56) References Cited

U.S. PATENT DOCUMENTS 5,835,163 A * 11/1998 Liou .................. G06F 16/7847
348/700

FOREIGN PATENT DOCUMENTS

JP 2022542566 A 10/2022

OTHER PUBLICATIONS

Author: Gioele Ciaparrone, Francisco Luque Sánchez , Siham Tabik [et. al] Title: Deep Learning in Video Multi-Object Tracking: a Survey Title of the item: Neurocomputing Date: 2019 Link: http://arxiv.org/pdf/1907.12740.

(Continued)

*Primary Examiner* — Idowu O Osifade
(74) *Attorney, Agent, or Firm* — Finnegan, Henderson, Farabow, Garrett & Dunner, LLP

(57) ABSTRACT

Multi-object tracking (MOT) in video sequences plays a critical role in various computer vision applications. The primary objective of MOT is to accurately localize and track objects across consecutive frames. However, existing MOT approaches often suffer from computational limitations and low frame rates in commodity machines, which hinders real-time performance. Present disclosure provides method and system for performing content aware multi-object tracking. The system first classifies video into slow and fast moving object content videos depending on features of objects to be tracked in frames. Then, system applies a computationally intensive deep sort algorithm to perform tracking of objects by selectively skipping frames. Thereafter, the system applies linear approximate Kalman prediction for slow object content videos and quadratic interpolation for fast object content videos as low computation tracking techniques for tracking objects present in skipped frames, thus significantly improving execution speed while reducing computational load on the system.

12 Claims, 5 Drawing Sheets

(51) Int. Cl.
*G06V 10/25* (2022.01)
*G06V 10/764* (2022.01)

(56) References Cited

OTHER PUBLICATIONS

Author: Luca Fiori Title: Local and Global Deep Features for Multi Object Tracking Title of the item: Thesis Date: 2021 Link: https://usiena-air.unisi.it/bitstream/11365/1149468/5/phd_unisi_076679.pdf.

Author: Ajit Jadhav, Prerana Mukherjee, Vinay Kaushik and Brejesh Lall Title: Aerial multi-object tracking by detection using deep association networks Date: 2019 Link:http://arxiv.org/pdf/1909.01547.

Author: Jiarui Cai, Yizhou Wang, Haotian Zhang [et. al] Title: IA-MOT: Instance-Aware Multi-Object Tracking with Motion Consistency Date: 2020 Link:http://arxiv.org/pdf/1909.01547.

* cited by examiner

METHOD AND SYSTEM FOR PERFORMING CONTENT AWARE MULTI-OBJECT TRACKING

PRIORITY CLAIM

This U.S. patent application claims priority under 35 U.S.C. § 119 to: Indian Patent Application number 202321072613, filed on Oct. 25, 2023. The entire contents of the aforementioned application are incorporated herein by reference.

TECHNICAL FIELD

The disclosure herein generally relates to multi-object tracking, and, more particularly, to a method and a system for performing content aware multi-object tracking.

BACKGROUND

With the increased utilization of aerial imaging for image and video capturing, automatic object tracking has emerged as a crucial research area in the field of remote sensing. Over the past few years, the application of object tracking techniques on Unmanned Aerial Vehicle (UAV) captured images/videos and surveillance images/videos has witnessed significant advancements. Firstly, the aerial perspective provided by UAVs grants a broader view of the scene, thereby enabling the tracking of objects across large areas. Secondly, the mobility and flexibility of UAV platforms allow to accomplish different tasks in real-time which were not feasible earlier, such as live broadcast, surveillance for military purposes, criminal investigations, traffic monitoring, as well as sports and entertainment events.

Further, in the field of UAV based video analysis, multi-object tracking (MOT) is a rapidly growing area of research that involves accurately locating and tracking multiple objects in consecutive frames. Conventionally, MOT algorithms are applied on continuous image frames extracted from video sequences captured at a real-time rate of 30 frames per second (FPS).

Moreover, existing MOT algorithms often struggle to achieve satisfactory speed as the speed achieved typically falls below 20 FPS even when executed on resource intensive high-end GPUs. However, the FPS achieved in commodity machine is even lesser that is the FPS falls below even 3.

Hence, the existing MOT algorithms are computationally expensive as they require high-end GPUs for processing else the runtime of the algorithms significantly increases. Additionally, the FPS achieved by the existing MOT algorithms is also low which further hinders with the real-time performance of the algorithms.

SUMMARY

Embodiments of the present disclosure present technological improvements as solutions to one or more of the above-mentioned technical problems recognized by the inventors in conventional systems. For example, in one aspect, there is provided a method for performing content aware multi-object tracking. The method comprises receiving, by a system via one or more hardware processors, a video sequence of a captured video on which multi-object tracking needs to be performed, and a frame skip information, wherein the video sequence comprises a plurality of frames, wherein the frame skip information comprises a frame skip number, wherein the frame skip number refers to a number of frames to be skipped during the multi-object tracking; selecting, by the system via the one or more hardware processors, one or more frames from the plurality of frames based on a predefined criteria, wherein the selected one or more frames are referred as a group of frames; identifying, by the system via the one or more hardware processors, a plurality of objects present in the GOF using an object detection algorithm; categorizing, by the system via the one or more hardware processors, each object of the plurality of objects that are present in the GOF in a predefined object group of one or more predefined object groups using an object categorization technique, wherein the one or more predefined object groups comprise a fast motion object group and a slow motion object group; identifying, by the system via the one or more hardware processors, a prevalent predefined object group among the one or more predefined object groups in the GOF, wherein the prevalent predefined object group is identified based on a probability score assigned to each object during categorization; determining, by the system via the one or more hardware processors, whether the prevalent predefined object group is the fast motion object group; applying, by the system via the one or more hardware processors, a computation intensive deep sort algorithm on at least one frame of the plurality of frames based on the frame skip number to perform tracking of the plurality of objects present in the captured video in a skipping manner; and performing, by the system via the one or more hardware processors, a quadratic interpolation on one or more skipped frames present in the captured video to perform tracking of the plurality of objects present in the captured video upon determining that the prevalent predefined object group is the fast motion object group, wherein the one or more skipped frames refers to at least one remaining frame in the plurality of frames on which the computation intensive deep sort algorithm is not applied, and wherein the quadratic interpolation is a low computation tracking technique, thereby reducing the computational load of the system.

In an embodiment, the object categorization technique comprises: determining an object class of each object that is present in the GOF using a pretrained class detection model, wherein the pretrained class detection model provide a set of object classes present in the GOF, a confidence score associated with each object class, and a bounding box for each object; estimating frequency of each object class in the GOF by counting occurrence of each object class; estimating the probability score for each object class in the GOF based on the estimated frequency and a number of objects present in the GOF using a probability calculation formula; and categorizing each object of the plurality of objects that are present in the GOF in the predefined object group based on an object class of the respective object, wherein the object is categorized in the fast motion object group if the object class of the object predicts fast moving objects, and wherein object is categorized in the slow motion object group if the object class of the object predicts slow moving objects.

In an embodiment, the method comprises: applying, by the system via the one or more hardware processors, an approximate linear Kalman filter on one or more skipped frames present in the captured video to perform tracking of the plurality of objects present in the captured video upon determining that the prevalent predefined object group is the slow motion object group, wherein the one or more skipped frames are frames present in captured video on which the computation intensive deep sort algorithm is not applied, wherein the approximate linear Kalman filter tracks one or more bounding boxes of each skipped frame based on the one or more bounding boxes of a previous frame present before the skipped frame, wherein the bounding boxes of the previous frame are obtained using the computation intensive deep sort algorithm.

In an embodiment, the approximate linear Kalman filter is a low computation tracking technique, thereby reducing the computational load of the system.

In another aspect, there is provided a system for performing content aware multi-object tracking. The system comprises a memory storing instructions; one or more communication interfaces; and one or more hardware processors coupled to the memory via the one or more communication interfaces, wherein the one or more hardware processors are configured by the instructions to: receive a video sequence of a captured video on which multi-object tracking needs to be performed, and a frame skip information, wherein the video sequence comprises a plurality of frames, wherein the frame skip information comprises a frame skip number, wherein the frame skip number refers to a number of frames to be skipped during the multi-object tracking; select one or more frames from the plurality of frames based on a predefined criteria, wherein the selected one or more frames are referred as a group of frames (GOF); identify a plurality of objects present in the GOF using an object detection algorithm; categorize each object of the plurality of objects that are present in the GOF in a predefined object group of one or more predefined object groups using an object categorization technique, wherein the one or more predefined object groups comprise a fast motion object group and a slow motion object group; identify a prevalent predefined object group among the one or more predefined object groups in the GOF, wherein the prevalent predefined object group is identified based on a probability score assigned to each object during categorization; determine whether the prevalent predefined object group is the fast motion object group; apply a computation intensive deep sort algorithm on at least one frame of the plurality of frames based on the frame skip number to perform tracking of the plurality of objects present in the captured video in a skipping manner; and perform a quadratic interpolation on one or more skipped frames present in the captured video to perform tracking of the plurality of objects present in the captured video upon determining that the prevalent predefined object group is the fast motion object group, wherein the one or more skipped frames refers to at least one remaining frame in the plurality of frames on which the computation intensive deep sort algorithm is not applied, and wherein the quadratic interpolation is a low computation tracking technique, thereby reducing the computational load of the system.

In yet another aspect, there are provided one or more non-transitory machine-readable information storage mediums comprising one or more instructions which when executed by one or more hardware processors perform content aware multi-object tracking by receiving, by a system, a video sequence of a captured video on which multi-object tracking needs to be performed, and a frame skip information, wherein the video sequence comprises a plurality of frames, wherein the frame skip information comprises a frame skip number, wherein the frame skip number refers to a number of frames to be skipped during the multi-object tracking; selecting, by the system, one or more frames from the plurality of frames based on a predefined criteria, wherein the selected one or more frames are referred as a group of frames; identifying, by the system, a plurality of objects present in the GOF using an object detection algorithm; categorizing, by the system, each object of the plurality of objects that are present in the GOF in a predefined object group of one or more predefined object groups using an object categorization technique, wherein the one or more predefined object groups comprise a fast motion object group and a slow motion object group; identifying, by the system, a prevalent predefined object group among the one or more predefined object groups in the GOF, wherein the prevalent predefined object group is identified based on a probability score assigned to each object during categorization; determining, by the system, whether the prevalent predefined object group is the fast motion object group; applying, by the system, a computation intensive deep sort algorithm on at least one frame of the plurality of frames based on the frame skip number to perform tracking of the plurality of objects present in the captured video in a skipping manner; and performing, by the system, a quadratic interpolation on one or more skipped frames present in the captured video to perform tracking of the plurality of objects present in the captured video upon determining that the prevalent predefined object group is the fast motion object group, wherein the one or more skipped frames refers to at least one remaining frame in the plurality of frames on which the computation intensive deep sort algorithm is not applied, and wherein the quadratic interpolation is a low computation tracking technique, thereby reducing the computational load of the system.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
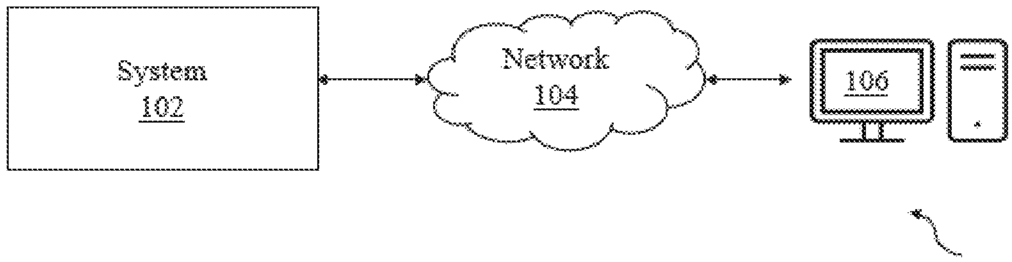
FIG. 1 is an example representation of an environment, related to at least some example embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Multi-object tracking (MOT) in video sequences plays a critical role in various computer vision applications. The primary objective of the MOT is to accurately localize and track objects across consecutive frames. However, existing MOT approaches often suffer from computational limitations and low frame rates in commodity machines, which hinders real-time performance. Additionally, the existing MOT approaches perform lots of resource intensive computations which further increases computational load.

So, multi-object tracking techniques that can significantly reduce the MOT algorithm's runtime while minimizing considerable compromise in accuracy is still to be explored.

Embodiments of the present disclosure overcome the above-mentioned disadvantages by providing a method and a system for performing content aware multi-object tracking. The system of the present disclosure first classifies video into slow and fast moving object content videos depending on the features of the objects to be tracked in the frames. Then, the system applies a computationally intensive deep sort algorithm to perform tracking of objects by selectively skipping frames. Thereafter, the system applies linear approximate Kalman prediction for slow object content videos and quadratic interpolation for fast object content videos as low computation tracking techniques for tracking objects present in skipped frames.

In the present disclosure, the system and the method first categorize the dataset based on the object content and then based on the object content, decides on the techniques to be utilized for performing multi-object tracking, thus ensuring improved efficiency of the tracking process. Further, the system applies the computationally intensive deep sort algorithm only on selected frames, and uses low computation tracking techniques for tracking objects present in skipped frames, thus significantly improving execution speed while reducing the computational load on the system which further enables high FPS in real-time MOT applications on commodity machine and reliable object tracking across the videos.

Referring now to the drawings, and more particularly to FIGS. 1 through 5, where similar reference characters denote corresponding features consistently throughout the figures, there are shown preferred embodiments and these embodiments are described in the context of the following exemplary system and/or method.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, categorizing object in predefined object groups, etc. The environment 100 generally includes a system 102, an electronic device 106 (hereinafter also referred as a user device 106), each coupled to, and in communication with (and/or with access to) a network 104. It should be noted that one user device is shown for the sake of explanation; there can be more number of user devices.

The network 104 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among two or more of the parts or users illustrated in FIG. 1, or any combination thereof.

Various entities in the environment 100 may connect to the network 104 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof.

The user device 106 is associated with a user (e.g., a search and rescue personnel/surveillance officer/drone user) who wants to track objects present in a captured video. Examples of the user device 106 include, but are not limited to, a personal computer (PC), a mobile phone, a tablet device, a Personal Digital Assistant (PDA), a server, a voice activated assistant, a smartphone, and a laptop.

The system 102 includes one or more hardware processors and a memory. The system 102 is first configured to receive a video sequence of a captured video on which multi-object tracking needs to be performed via the network 104 from the user device 106. The video sequence includes a plurality of frames and each frame of the plurality of frames comprises a plurality of objects. The system 102 then categorizes each object into two predefined object groups: "fast motion object group" such as cars, trucks, and buses, and "slow motion object group" such as pedestrians. Thereafter, the system 102 identifies a prevalent predefined object group. Based on this information, the system 102 determines whether the video sequence contains mostly fast or slow motion object content.

Further, the system 102 applies computation intensive deep sort algorithm on some selected frames to perform tracking of the plurality of objects present in the captured video in a skipping manner. The process of selecting/obtaining some frames is explained in detail with reference to FIG. 3. In video sequence, where fast motion objects are mostly occurring, the system 102 uses a quadratic interpolation to estimate the position of objects between selected frames with a unique track identification (ID) as it allows for smoother tracking by filling in the gaps between the selected frames. Additionally, in videos where slow motion objects are predominant, the system 102 applies an approximate Kalman linear prediction method as it helps to maintain tracking continuity for slow-moving objects by estimating their positions in the frames between the selected frames.

The process of performing content aware multi-object tracking is explained in detail with reference to FIGS. 4A and 4B.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100 (e.g., refer scenarios described above).

Figure 2:
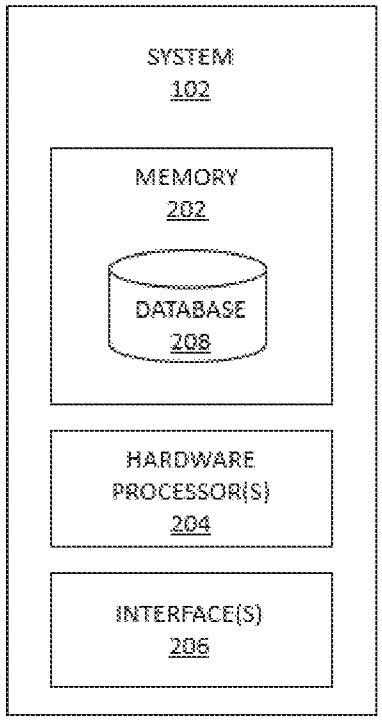
FIG. 2 illustrates an exemplary block diagram of a system for performing content aware multi-object tracking, in accordance with an embodiment of the present disclosure.

FIG. 2 illustrates an exemplary block diagram of the system 102 for performing content aware multi-object tracking, in accordance with an embodiment of the present disclosure. In some embodiments, the system 102 is embodied as a cloud-based and/or SaaS-based (software as a service) architecture. In some embodiments, the system 102 may be implemented in a server system. In some embodiments, the system 102 may be implemented in a variety of computing systems, such as laptop computers, notebooks, hand-held devices, workstations, mainframe computers, and the like.

In an embodiment, the system 102 includes one or more processors 204, communication interface device(s) or input/output (I/O) interface(s) 206, and one or more data storage devices or memory 202 operatively coupled to the one or more processors 204. The one or more processors 204 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 102 can be implemented in a variety of computing systems, such as laptop computers, notebooks, hand-held devices, workstations, mainframe computers, servers, a network cloud and the like.

The I/O interface device(s) 206 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 202 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a database 208 can be stored in the memory 202, wherein the database 208 may comprise, but are not limited to, predefined object groups, object detection algorithm, object categorization technique, one or more processes and the like. The memory 202 further comprises (or may further comprise) information pertaining to input(s)/output(s) of each step performed by the systems and methods of the present disclosure. In other words, input(s) fed at each step and output(s) generated at each step are comprised in the memory 202 and can be utilized in further processing and analysis.

It is noted that the system 102 as illustrated and hereinafter described is merely illustrative of an apparatus that could benefit from embodiments of the present disclosure and, therefore, should not be taken to limit the scope of the present disclosure. It is noted that the system 102 may include fewer or more components than those depicted in FIG. 2.

Figure 3:
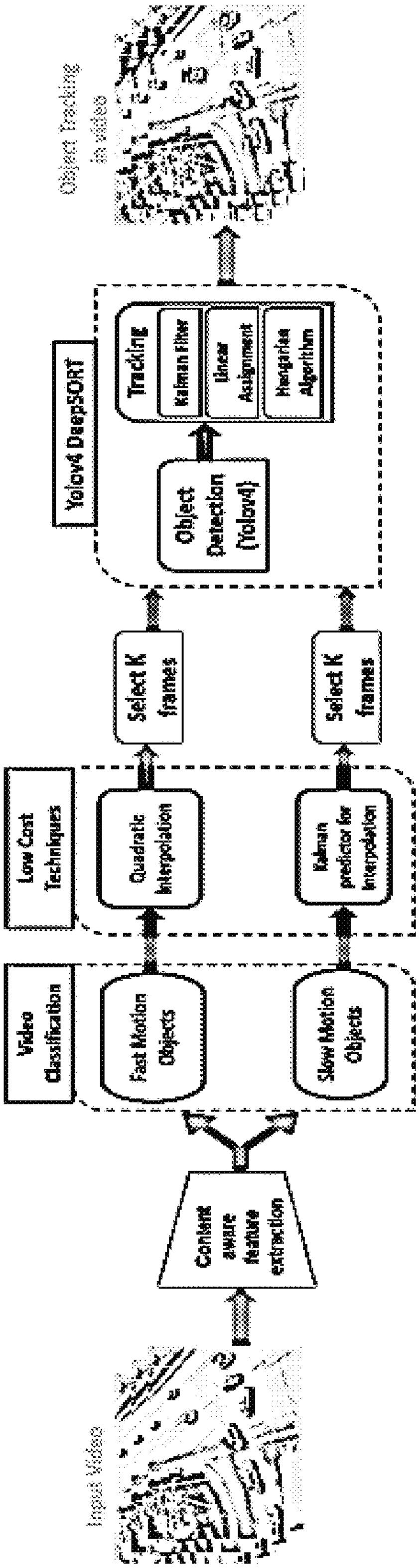
FIG. 3 illustrates a schematic block diagram representation of schematic block diagram representation of a multi-object tracking process performed by the system for tracking multiple objects present in a video, in accordance with an embodiment of the present disclosure.

FIG. 3 illustrates a schematic block diagram representation of a multi-object tracking process performed by the system 102 for tracking multiple objects present in a video, in accordance with an embodiment of the present disclosure.

As seen in FIG. 3, the system 102 first receives a captured video on which multi-object tracking needs to be performed. The system 102 then performs content aware feature extraction in which a few frames of the captured video called a group of frames (GOF) are selected from the video. Then, the system 102 uses a pretrained class detection model to identify object class of each object that is present in the GOF. The identified object classes/groups may be denoted as $C_1, C_2, \ldots, C_m$. In particular, the pretrained class detection model provides a set of object classes present in the GOF, a confidence score associated with each object class, and bounding boxes of objects present in the GOF. Once the object classes are available, the system 102 determines object distribution in the GOF by counting the occurrences of each object class. Then, the system 102 calculates the probabilities associated with each object class present in the GOF using a probability calculation formula defined as:

$$P_{c_i} = \frac{\text{Count object } C_i \text{ in } GOF}{\text{Total objects in } GOF},\ i = 1,2,3 \ldots m$$

Thereafter, the system 102 identifies the object class with the maximum probability i.e., the mostly occurring object within the video sequence are identified. The mostly occurring object can fall into one or more predefined object groups, such as fast motion object group comprising objects like car and trucks, and slow motion object group comprising objects like pedestrians and cycles.

Further, the system checks whether the mostly occurring object falls into fast motion object group or slow motion object group.

The system 102 applies a computation intensive deep sort algorithm on selected 'K' frames to perform tracking of the plurality of objects present in the captured video in a skipping manner. The 'K' is obtained based on a frame skip number 'n' that the system 102 receives as an input from the user device 106. It should be noted that the n is selected by the user to strike a balance between computational accuracy and tracking speed, considering the video's characteristics. So, depending on the specific video characteristics, n can be set to various numbers and then based on n and the total number of frames, N, the K is obtained using the equation K=N/(n+1). So, if the frame skip number n is '0' then K=N/(0+1)=N. Similarly, if the frame skip number n is '1', then K will be N/(1+1)=N/2 and so on.

In an embodiment, without limiting the scope of the invention, the computation intensive deep sort algorithm is YOLO deep sort algorithm.

If the mostly occurring object falls into fast motion object group, then the system 102 performs the quadratic interpolation on remaining frames i.e., the skipped frames present in the captured video to perform tracking of the plurality of objects present in the captured video.

In case, the mostly occurring object falls into slow motion object group, the system 102 applies an approximate linear Kalman filter on the skipped frames present in the captured video to perform tracking of the plurality of objects present in the captured video.

Figure 4A:
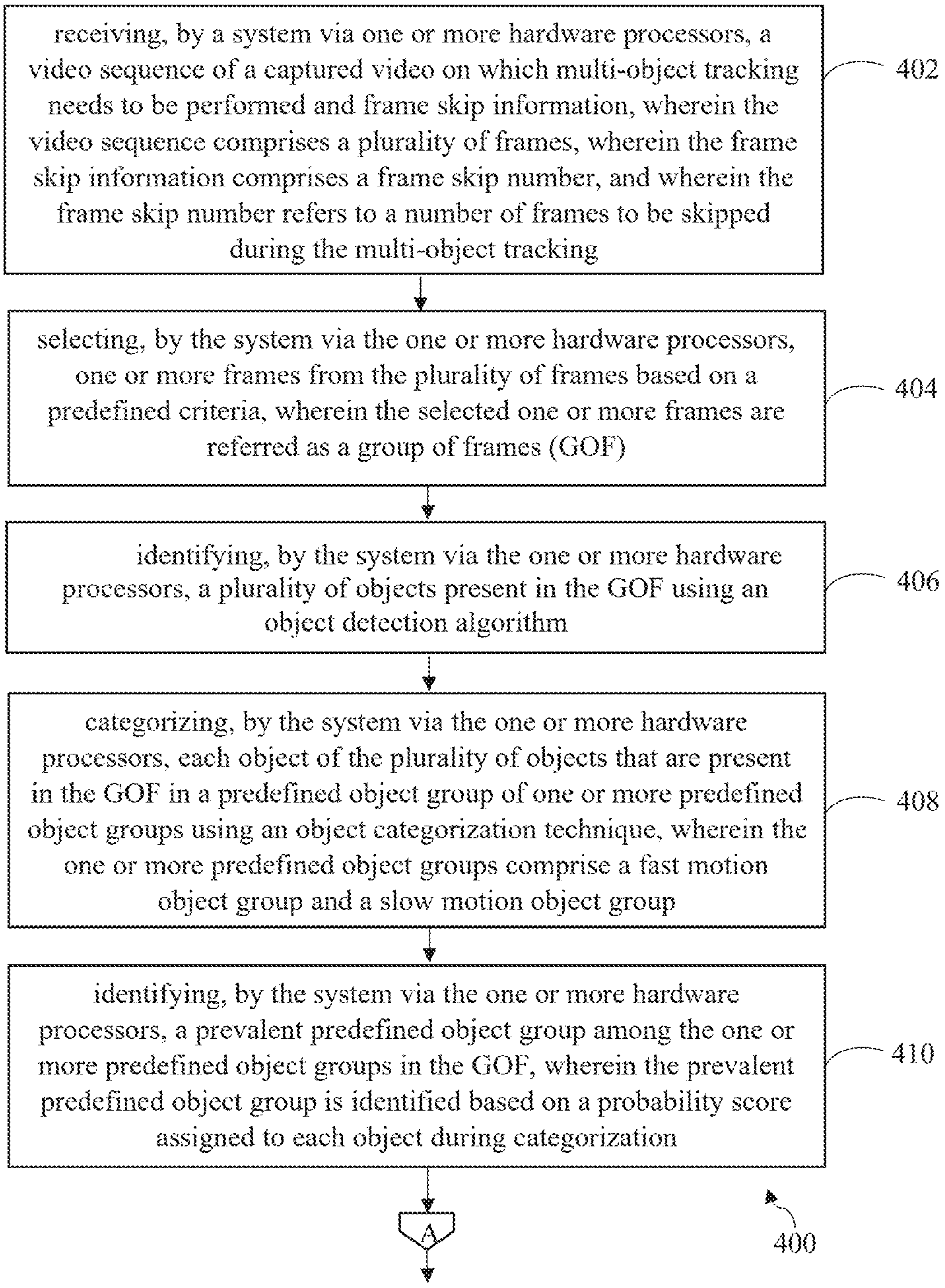
FIGS. 4A and 4B, collectively, illustrate an exemplary flow diagram of a method for performing content aware multi-object tracking, in accordance with an embodiment of the present disclosure.
Figure 4B:
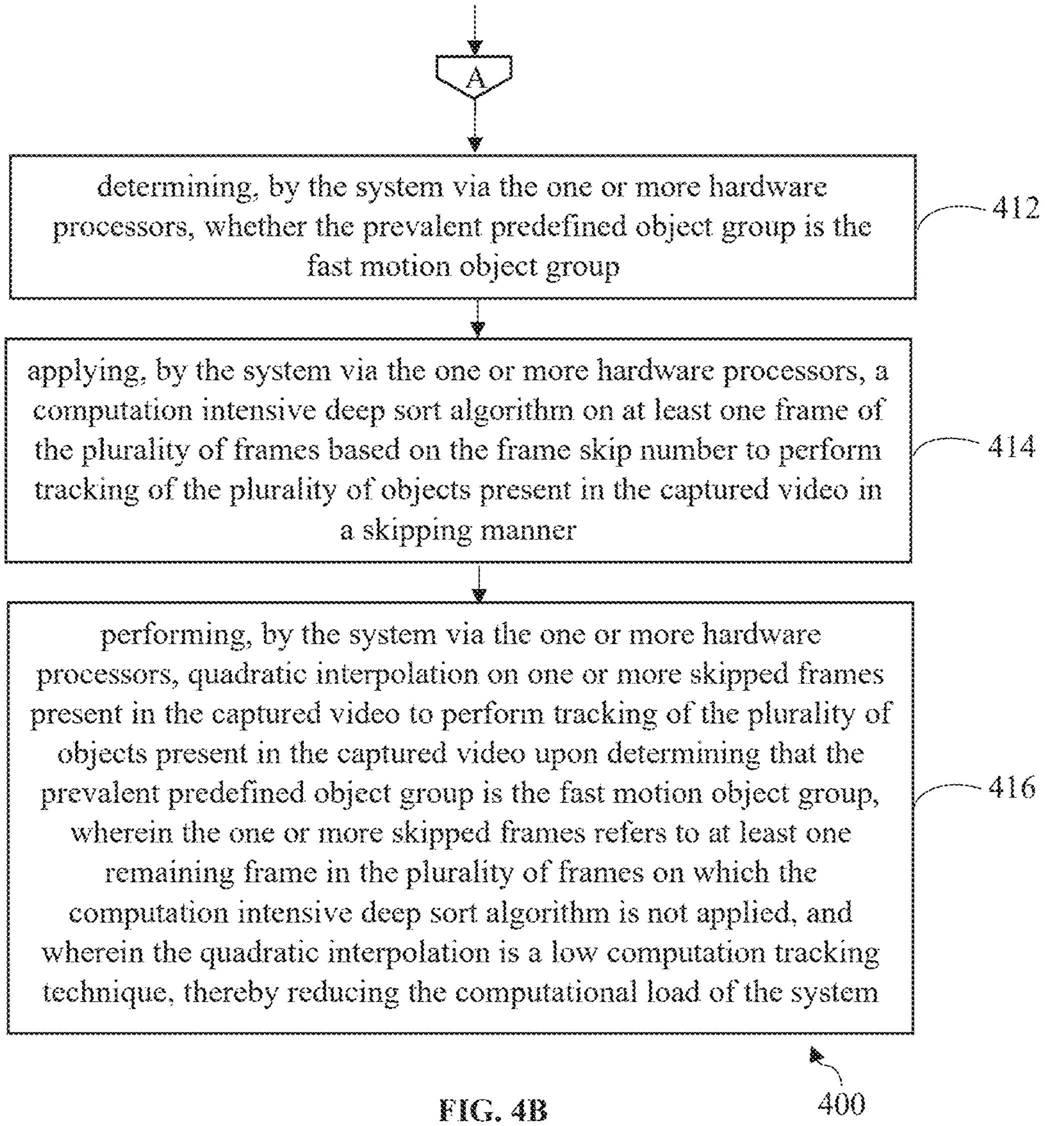

FIGS. 4A and 4B, collectively, with reference to FIGS. 1 to 3, represent an exemplary flow diagram of a method 400 for performing content aware multi-object tracking, in accordance with an embodiment of the present disclosure. The method 400 may use the system 102 of FIGS. 1 and 2 for execution. In an embodiment, the system 102 comprises one or more data storage devices or the memory 208 operatively coupled to the one or more hardware processors 206 and is configured to store instructions for execution of steps of the method 400 by the one or more hardware processors 206. The sequence of steps of the flow diagram may not be necessarily executed in the same order as they are presented. Further, one or more steps may be grouped together and performed in form of a single step, or one step may have several sub-steps that may be performed in parallel or in sequential manner. The steps of the method of the present disclosure will now be explained with reference to the components of the system 102 as depicted in FIG. 2 and FIG. 1.

At step 402 of the present disclosure, the one or more hardware processors 206 of the system 102 receive a video sequence of a captured video on which multi-object tracking needs to be performed and frame skip information. The video sequence includes a plurality of frames. The frame skip information comprises a frame skip number (also referred as 'n') that particularly refers to a number of frames to be skipped during the multi-object tracking. In an embodiment, the frame skip number is crucial in optimizing the trade-off between computational speed and tracking performance/accuracy. So, depending on the video, n can be set to various numbers and the K can be determined based on the total number of frames, N and the frame skip number n. For instance, n can be chosen as 1, 2 and the like. So, K will be N/2, N/3, and the like.

At step 404 of the present disclosure, the one or more hardware processors 206 of the system 102 select one or more frames from the plurality of frames based on a predefined criteria. In an embodiment, the predefined criteria can be a random selection. In another embodiment, the predefined criteria can be initial/last few frames. The selected one or more frames are referred as a group of frames (GOF).

At step 406 of the present disclosure, the one or more hardware processors 206 of the system 102 identify a plurality of objects present in the GOF using an object detection algorithm. In an embodiment, without limiting the scope of the invention, the object detection algorithm is YOLOv4 algorithm. However, any object detection algorithm available in the art or in future available can be used for the same purpose. In an exemplary scenario, if the observed video is of a road, then the plurality of objects can be car, jeep, pedestrians etc. So, this identification that a particular object is a car, and the other object is a pedestrian is performed at this step.

At step 408 of the present disclosure, the one or more hardware processors 206 of the system 102 categorize each object of the plurality of objects that are present in the GOF in a predefined object group of one or more predefined object groups using an object categorization technique. The one or more predefined object groups comprise a fast motion object group and a slow motion object group. The above step can be better understood by way of the following description.

In an embodiment, the object categorization technique first determines an object class of each object that is present in the GOF using a pretrained class detection model. In one embodiment, without limiting the scope of the invention, the pretrained class detection model is YOLOv4 model. In particular, when the pretrained class detection model is used on the GOF, it provides a set of object classes present in the GOF, a confidence score associated with each object class, and a bounding box for each object.

With respect to previous exemplary scenario, as the system 102 already knows that the particular object is a car, and the other object is a pedestrian. Now, at this step, the system 102 determines that the car belongs to a class $C_1$. Similarly, the pedestrian may belong to class $C_2$ and so on using the pretrained class detection model. The pretrained class detection model also provides the confidence score for class detected for each object. In an embodiment, the confidence score represents the confidence with which the model is predicting the class of a particular object. So, basically it is represented in a percentage form. Like, the pedestrian belongs to class $C_2$ with confidence score of '85' i.e., the model is 85% sure that the pedestrian belongs to class $C_2$.

Once the object classes of each object present in the GOF is available, the one or more hardware processors 206 of the system 102 estimate frequency of each object class in the GOF by counting occurrence of each object class. In particular, how many $C_1, C_2 \ldots C_m$ are available is determined.

Thereafter, the system 102 estimates the probability score for each object class in the GOF based on the estimated frequency and a number of objects present in the GOF using the probability calculation formula. In particular, the probability of $C_1, C_2 \ldots C_m$ is determined.

Further, the system 102 categorizes each object of the plurality of objects that are present in the GOF in the predefined object group based on an object class of the respective object. The object is categorized in the fast motion object group if the object class of the object predicts fast moving objects, such as cars, buses and tracks. The object is categorized in the slow motion object group if the object class of the object predicts slow moving objects, such as pedestrians and bicycles. It should be noted that the object categorization technique, based on a heuristic assumption, generalizes that cars tend to have higher speed as compared to pedestrians.

At step 410 of the present disclosure, the one or more hardware processors 206 of the system 102 identify a prevalent predefined object group among the one or more predefined object groups in the GOF. In an embodiment, the prevalent predefined object group is identified based on a probability score assigned to each object during categorization. In particular, the object class (also referred as mostly occurring objects) with maximum probability is determined at this step.

At step 412 of the present disclosure, the one or more hardware processors 206 of the system 102 determine whether the prevalent predefined object group is the fast motion object group.

At step 414 of the present disclosure, the one or more hardware processors 206 of the system 102 apply a computation intensive deep sort algorithm on at least one frame of the plurality of frames based on the frame skip number to perform tracking of the plurality of objects present in the captured video in a skipping manner. In an embodiment, without limiting the scope of the invention, the computation intensive deep sort algorithm is a YOLO-DeepSORT algorithm. However, any deep sort algorithm like DeepSCSORT, StongSORT etc., that are available for same purpose can be used for performing tracking of the objects. The process of determining the at least one frame is explained in detail with reference to FIG. 3, hence not explained here for the sake of brevity.

At step 416 of the present disclosure, the one or more hardware processors 206 of the system 102 perform quadratic interpolation on one or more skipped frames present in the captured video to perform tracking of the plurality of objects present in the captured video upon determining that the prevalent predefined object group is the fast motion object group. In an embodiment, the one or more skipped frames refers to at least one remaining frame in the plurality of frames on which the computation intensive deep sort algorithm is not applied. The above step can be better understood by way of the following description.

As discussed earlier, the computation intensive deep sort algorithm is used for processing frames at regular intervals (e.g., t=m, t=m+n, t=m+2n) where n≥0. So, object detection and tracklet updates occur during these frames. It should be noted that the tracklet refers to a fragment of a track followed by a moving object, as constructed by an image recognition system.

However, between frames t=m+1 to t=m+2n−1, the system 102 may apply quadratic interpolation for tracklet estimation. It should be noted that the system 102 assumes that the objects maintain proper class and unique track IDs.

Further, for applying quadratic interpolation, the system 102 require the bounding box coordinates of each object with an identical track ID in frames t=m, t=m+n, and t=m+2n. In an embodiment, the bounding box coordinates of an object can be denoted as $$(x_0^m, y_0^m, x_1^m, y_1^m),$$

$$(x_0^{m+n}, y_0^{m+n}, x_1^{m+n}, y_1^{m+n})$$

and $$\left(x_0^{m+2n}, y_0^{m+2n}, x_1^{m+2n}, y_1^{m+2n}\right)$$

for frames t=m, t=m+n and t=m+2n, respectively. It should be noted that the $(x_0, y_0)$ and $(x_1, y_1)$ represents the left top and right bottom coordinates of the bounding boxes of an object with the same track ID in frames t=m, t=m+n, and t=m+2n. The interpolation equation is:

$$f(z) = az^2 + bz + c,$$

If the coordinates are substituted, then interpolation equation yields a system of equations mentioned below.

$$am^2 + bm + c = x_m^0,$$

$$a(m+n)^2 + b(m+n) + c = x_{m+n}^0,$$

$$a(m+2n)^2 + b(m+2n) + c = x_{m+2n}^0$$

The above equations can be represented in matrix form as a system of linear equations:

$$\begin{bmatrix} m^2 & m & 1 \\ (m+n)^2 & (m+n) & 1 \\ (m+2n)^2 & (m+n) & 1 \end{bmatrix} \begin{bmatrix} a \\ b \\ c \end{bmatrix} = \begin{bmatrix} x_m^0 \\ x_{m+n}^0 \\ x_{m+2n}^0 \end{bmatrix}$$

By solving the system of linear equations, the system 102 determines the values of the unknowns a, b, and c. The system 102 repeats the process for other coordinates and objects bounding boxes. Once the optimum values of a, b, c are obtained, the system 102 use them to interpolate tracklets between t=m+1 to t=m+2n−1. So, by performing Quadratic interpolation, which is a low computation tracking technique, the system 102 obtains more accurate estimations of object positions and velocities by considering the curvature and nonlinear characteristics of their motion while reducing the computational load of the system 102.

In an embodiment, upon determining that the prevalent predefined object group is the slow motion object group, the system 102 applies an approximate linear Kalman filter on one or more skipped frames present in the captured video to perform tracking of the plurality of objects present in the captured video. The approximate linear Kalman filter tracks one or more bounding boxes of each skipped frame based on the one or more bounding boxes of a previous frame present before the skipped frame. And the bounding boxes of the previous frame are obtained using the computation intensive deep sort algorithm applied at step 414. The above step can be better understood by way of the following description.

In an embodiment, the computation intensive deep sort algorithm utilizes the Kalman filter to predict tracklets in future frames based on the current frame. The Kalman filter estimates future state variables using present states and updates them with new measurements. The main equations in form of state space can be represented as:

$$X_t = AX_{t-1} + w_t,$$

$$Y_t = CX_t + v_t$$

Where, $w_t$ and $v_t$ represent process noise and measurement noise, respectively, $X_t$ encodes object position and velocity, $Y_t$ refers to the observed bounding box coordinates as a vector in the format of (x, y, width, height), and A and C refers to system and observation matrices.

The approximate linear Kalman filter predicts the $t^{th}$ time step based on the observation at $t-1^{th}$ time step as follows:

$$\hat{X}_{t|t-1} = A\hat{X}_{t-1|t-1},$$

$$\hat{Y}_{t|t-1} = C\hat{X}_{t|t-1}, \text{ and}$$

$$\sum_{t|t-1|} = A\sum_{t-1|t-1|} A^T + \sum_w.$$

The above mentioned equations at para 68 are also referred as prediction equations. Now, as the true observation arrives $Y_t$, at $t^{th}$ time step, the Kalman Filter updates its states and covariance parameters as follows:

$$L_t = \Sigma_{t|t-1} C^T \left[C\Sigma_{t|t-1} C^T + \Sigma_v\right]^{-1},$$

$$\overline{X}_{t|t} = \overline{X}_{t|t-1} + L_t\left[Y_t - \overline{Y}_{t|t-1}\right], \Sigma_{t|t} = \Sigma_{t|t-1} - L_t\left[C\Sigma_{t|t-1} C^T + \Sigma_v\right] L_t^T$$

Where, $L_t$ typically referred as Kalman Gain, $\Sigma_w$ and $\Sigma_v$ are the measurement and observation noise covariance matrices, respectively, and $\Sigma_{t-1|t-1}$ denotes error covariance matrix.

In the method 400, the system 102 does not process every frame for tracking. Instead, K frames are selected for processing. Specifically, the Kalman filter prediction and update steps are applied at frame t=m and frame t=m+n, where n≥0

(frame skip). The system 102 tries to predict tracklets in frames t=m+1, t=m+2, . . . , t=m+n−1 where no measurements $Y_t$ are available, considering the skipping scenario. So, for slow-motion objects, the system 102 assumes that the estimated measurement $\hat{Y}_{t|t-1}$ is equal to $Y_t$ due to the smooth linear movement. This assumption is based on the observation that measurements do not experience abrupt displacement in such cases and exhibit very smooth linear movement in the few consecutive frames. Now, the state update equation in Kalman Filter becomes:

$$\hat{X}_{t|t} = \hat{X}_{t|t-1}$$

So, when the system 102 substitutes the state update equation into the prediction equation, the prediction equation becomes:

$$\hat{X}_{t+1|t} = A\hat{X}_{t|t}$$

In this way, the system approximates the Kalman filter to predict the states of slow-motion objects from t=m+1 to the time stamp t=m+n−1, thereby eliminating the need for measurements in frames t=m+1 to t=m+n−1, while reducing the computational load of the computation intensive deep sort algorithm for slow object content videos.

Figure 5:
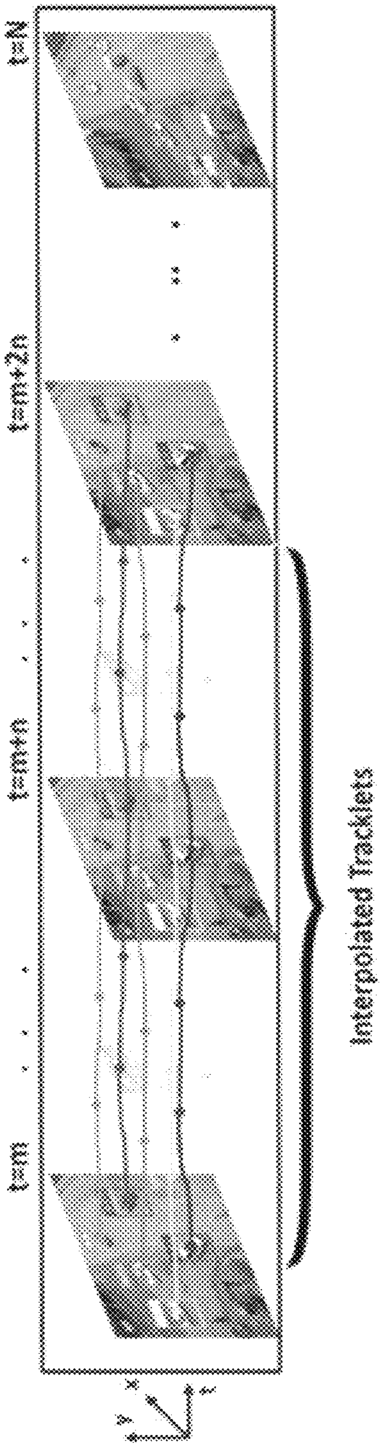
FIG. 5 illustrates an example representation of a low-cost technique followed for tracking objects, in accordance with an embodiment of the present disclosure.

FIG. 5 illustrates an example representation of a low-cost technique followed for tracking objects, in accordance with an embodiment of the present disclosure.

As seen in FIG. 5, the computation intensive deep sort algorithm is applied on skipping fashion i.e., at frame m, m+n, m+2n . . . N like that. And the objects present in the skipped frames i.e., the in-between frames that are not present in the FIG. 5 are tracked using low-cost techniques, such as the quadratic interpolation and the approximate linear Kalman filter.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

As discussed earlier, existing MOT approaches often suffer from computational limitations and low frame rates in commodity machines, which hinders real-time performance. So, to overcome the disadvantages, embodiments of the present disclosure provide a method and a system for performing content aware object tracking. More specifically, the system and the method first categorize the dataset based on the object content and then based on the object content, decides on the techniques to be utilized for performing multi-object tracking, thereby ensuring improved efficiency of the tracking process. Further, the system applies the computationally intensive deep sort algorithm only on selected frames, and uses low computation tracking techniques for tracking objects present in skipped frames, thus significantly improving execution speed while reducing the computational load on the system which further enables high FPS in real-time MOT applications on commodity machine and reliable object tracking across the videos.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:

receiving, by a system via one or more hardware processors, a video sequence of a captured video on which multi-object tracking needs to be performed, and a frame skip information, wherein the video sequence comprises a plurality of frames, wherein the frame skip information comprises a frame skip number, and wherein the frame skip number refers to a number of frames to be skipped during the multi-object tracking;

selecting, by the system via the one or more hardware processors, one or more frames from the plurality of frames based on a predefined criteria, wherein the selected one or more frames are referred as a group of frames (GOF);

identifying, by the system via the one or more hardware processors, a plurality of objects present in the GOF using an object detection algorithm;

categorizing, by the system via the one or more hardware processors, each object of the plurality of objects that are present in the GOF in a predefined object group of one or more predefined object groups using an object categorization technique, wherein the one or more predefined object groups comprise a fast motion object group and a slow motion object group;

identifying, by the system via the one or more hardware processors, a prevalent predefined object group among the one or more predefined object groups in the GOF, wherein the prevalent predefined object group is identified based on a probability score assigned to each object during categorization;

determining, by the system via the one or more hardware processors, whether the prevalent predefined object group is the fast motion object group;

applying, by the system via the one or more hardware processors, a computation intensive deep sort algorithm on at least one frame of the plurality of frames based on the frame skip number to perform tracking of the plurality of objects present in the captured video in a skipping manner; and performing, by the system via the one or more hardware processors, a quadratic interpolation on one or more skipped frames present in the captured video to perform tracking of the plurality of objects present in the captured video upon determining that the prevalent predefined object group is the fast motion object group, wherein the one or more skipped frames refers to at least one remaining frame in the plurality of frames on which the computation intensive deep sort algorithm is not applied, and wherein the quadratic interpolation is a low computation tracking technique, thereby reducing the computational load of the system.

2. The processor implemented method of claim 1, wherein the object categorization technique comprises:

determining an object class of each object that is present in the GOF using a pretrained class detection model, wherein the pretrained class detection model provides a set of object classes present in the GOF, a confidence score associated with each object class, and a bounding box for each object;

estimating frequency of each object class in the GOF by counting occurrence of each object class;

estimating the probability score for each object class in the GOF based on the estimated frequency and a number of objects present in the GOF using a probability calculation formula; and categorizing each object of the plurality of objects that are present in the GOF in the predefined object group based on an object class of the respective object, wherein the object is categorized in the fast motion object group if the object class of the object predicts fast moving objects, and wherein object is categorized in the slow motion object group if the object class of the object predicts slow moving objects.

3. The processor implemented method of claim 1, comprising:

applying, by the system via the one or more hardware processors, an approximate linear Kalman filter on one or more skipped frames present in the captured video to perform tracking of the plurality of objects present in the captured video upon determining that the prevalent predefined object group is the slow motion object group, wherein the approximate linear Kalman filter tracks one or more bounding boxes of each skipped frame based on the one or more bounding boxes of a previous frame present before the skipped frame, and wherein the bounding boxes of the previous frame are obtained using the computation intensive deep sort algorithm.

4. The processor implemented method of claim 3, wherein the approximate linear Kalman filter is a low computation tracking technique, thereby reducing the computational load of the system.

5. A system, comprising:

a memory storing instructions;

one or more communication interfaces; and one or more hardware processors coupled to the memory via the one or more communication interfaces, wherein the one or more hardware processors are configured by the instructions to:

receive a video sequence of a captured video on which multi-object tracking needs to be performed, and a frame skip information, wherein the video sequence comprises a plurality of frames, wherein the frame skip information comprises a frame skip number, and wherein the frame skip number refers to a number of frames to be skipped during the multi-object tracking;

select one or more frames from the plurality of frames based on a predefined criteria, wherein the selected one or more frames are referred as a group of frames (GOF);

identify a plurality of objects present in the GOF using an object detection algorithm;

categorize each object of the plurality of objects that are present in the GOF in a predefined object group of one or more predefined object groups using an object categorization technique, wherein the one or more predefined object groups comprise a fast motion object group and a slow motion object group;

identify a prevalent predefined object group among the one or more predefined object groups in the GOF, wherein the prevalent predefined object group is identified based on a probability score assigned to each object during categorization;

determine whether the prevalent predefined object group is the fast motion object group;

apply a computation intensive deep sort algorithm on at least one frame of the plurality of frames based on the frame skip number to perform tracking of the plurality of objects present in the captured video in a skipping manner; and perform a quadratic interpolation on one or more skipped frames present in the captured video to perform tracking of the plurality of objects present in the captured video upon determining that the prevalent predefined object group is the fast motion object group, wherein the one or more skipped frames refers to at least one remaining frame in the plurality of frames on which the computation intensive deep sort algorithm is not applied, and wherein the quadratic interpolation is a low computation tracking technique, thereby reducing the computational load of the system.

6. The system of claim 5, wherein the object categorization technique comprises:

determine an object class of each object that is present in the GOF using a pretrained class detection model, wherein the pretrained class detection model provide a set of object classes present in the GOF, a confidence score associated with each object class, and a bounding box for each object;

estimate frequency of each object class in the GOF by counting occurrence of each object class;

estimate the probability score for each object class in the GOF based on the estimated frequency and a number of objects present in the GOF using a probability calculation formula; and categorize each object of the plurality of objects that are present in the GOF in the predefined object group based on an object class of the respective object, wherein the object is categorized in the fast motion object group if the object class of the object predicts fast moving objects, and wherein object is categorized in the slow motion object group if the object class of the object predicts slow moving objects.

7. The system of claim 5, wherein the one or more hardware processors are configured by the instructions to:

apply an approximate linear Kalman filter on one or more skipped frames present in the captured video to perform tracking of the plurality of objects present in the captured video upon determining that the prevalent predefined object group is the slow motion object group, wherein the approximate linear Kalman filter tracks one or more bounding boxes of each skipped frame based on the one or more bounding boxes of a previous frame present before the skipped frame, and wherein the bounding boxes of the previous frame are obtained using the computation intensive deep sort algorithm.

8. The system of claim 7, wherein the approximate linear Kalman filter is a low computation tracking technique, thereby reducing the computational load of the system.

9. One or more non-transitory machine-readable information storage mediums comprising one or more instructions which when executed by one or more hardware processors cause:

receiving, by a system, a video sequence of a captured video on which multi-object tracking needs to be performed, and a frame skip information, wherein the video sequence comprises a plurality of frames, wherein the frame skip information comprises a frame skip number, and wherein the frame skip number refers to a number of frames to be skipped during the multi-object tracking;

selecting, by the system, one or more frames from the plurality of frames based on a predefined criteria, wherein the selected one or more frames are referred as a group of frames (GOF);

identifying, by the system, a plurality of objects present in the GOF using an object detection algorithm;

categorizing, by the system, each object of the plurality of objects that are present in the GOF in a predefined object group of one or more predefined object groups using an object categorization technique, wherein the one or more predefined object groups comprise a fast motion object group and a slow motion object group;

identifying, by the system, a prevalent predefined object group among the one or more predefined object groups in the GOF, wherein the prevalent predefined object group is identified based on a probability score assigned to each object during categorization;

determining, by the system, whether the prevalent predefined object group is the fast motion object group;

applying, by the system, a computation intensive deep sort algorithm on at least one frame of the plurality of frames based on the frame skip number to perform tracking of the plurality of objects present in the captured video in a skipping manner; and performing, by the system, a quadratic interpolation on one or more skipped frames present in the captured video to perform tracking of the plurality of objects present in the captured video upon determining that the prevalent predefined object group is the fast motion object group, wherein the one or more skipped frames refers to at least one remaining frame in the plurality of frames on which the computation intensive deep sort algorithm is not applied, and wherein the quadratic interpolation is a low computation tracking technique, thereby reducing the computational load of the system.

10. The one or more non-transitory machine-readable information storage mediums of claim 9, wherein the object categorization technique comprises:

determining an object class of each object that is present in the GOF using a pretrained class detection model, wherein the pretrained class detection model provides a set of object classes present in the GOF, a confidence score associated with each object class, and a bounding box for each object;

estimating frequency of each object class in the GOF by counting occurrence of each object class;

estimating the probability score for each object class in the GOF based on the estimated frequency and a number of objects present in the GOF using a probability calculation formula; and categorizing each object of the plurality of objects that are present in the GOF in the predefined object group based on an object class of the respective object, wherein the object is categorized in the fast motion object group if the object class of the object predicts fast moving objects, and wherein object is categorized in the slow motion object group if the object class of the object predicts slow moving objects.

11. The one or more non-transitory machine-readable information storage mediums of claim 9, wherein the one or more instructions which when executed by the one or more hardware processors further cause:

applying, by the system, an approximate linear Kalman filter on one or more skipped frames present in the captured video to perform tracking of the plurality of objects present in the captured video upon determining that the prevalent predefined object group is the slow motion object group, wherein the approximate linear Kalman filter tracks one or more bounding boxes of each skipped frame based on the one or more bounding boxes of a previous frame present before the skipped frame, and wherein the bounding boxes of the previous frame are obtained using the computation intensive deep sort algorithm.

12. The one or more non-transitory machine-readable information storage mediums of claim 11, wherein the approximate linear Kalman filter is a low computation tracking technique, thereby reducing the computational load of the system.

* * * * *